United States Patent [19]

Uba

[11] Patent Number: 4,495,259
[45] Date of Patent: Jan. 22, 1985

[54] VIBRATION RESISTANT BATTERY

[75] Inventor: Toshio Uba, Denver, Colo.

[73] Assignee: The Gates Rubber Company, Denver, Colo.

[21] Appl. No.: 465,735

[22] Filed: Feb. 11, 1983

[51] Int. Cl.³ .................... H01M 2/26; H01M 2/14
[52] U.S. Cl. ................................ 429/161; 429/129; 429/186; 429/208
[58] Field of Search ............ 429/66, 161, 208, 129, 429/186

[56] References Cited

U.S. PATENT DOCUMENTS

| | | | |
|---|---|---|---|
| 1,073,601 | 9/1913 | Gould | 429/161 X |
| 1,363,646 | 12/1920 | Gould | 429/186 X |
| 1,874,404 | 8/1932 | Wood | 429/129 |
| 1,992,817 | 2/1935 | Dunzweiler | 429/208 X |
| 2,521,924 | 9/1950 | Longaker | 429/129 X |
| 3,753,783 | 8/1973 | Eberle | 429/161 X |
| 4,359,509 | 11/1982 | Guimond et al. | 429/234 X |

Primary Examiner—Brian E. Hearn
Assistant Examiner—Stephen J. Kalafut
Attorney, Agent, or Firm—C. H. Castleman, Jr.; H. W. Oberg, Jr.; Raymond Fink

[57] ABSTRACT

An electrode plate group combination insulator and vibration support at least partially envelopes a plate group connecting strap. The insulator and vibration support includes a comb-like portion which underlies the strap, having teeth which intermesh with tabs projecting from the plates, and a hood portion which overlies the strap. The insulator and vibration support is preferably attached to the walls of the cell of the battery to thereby support the battery plate group and withstand vibrational forces.

16 Claims, 6 Drawing Figures

VIBRATION RESISTANT BATTERY

BACKGROUND OF THE INVENTION

This invention relates to batteries and more particularly to a battery capable of withstanding vibrational forces.

Batteries of one or more electrochemical cells are oftentimes subjected in use to thrusts and vibration along various axes of the battery. Connection junctures between the electrode plate tabs and connecting straps and between the connecting straps and intercell lugs and output terminals are particularly susceptible to stress cracking. Crack initiation and propogation is a problem in various battery systems, including alkaline and acid systems, and particularly in lead-acid batteries where high purity lead straps are especially prone to premature failure when subjected to vibration.

U.S. Pat. No. 4,216,277 to Uba solved his vibration problem by molding protuberant ribs into the lid of the battery housing, the ribs bearing down substantially on the lead strap connection to limit movement thereof. U.S. Pat. No. 3,909,294 to Kosuge et al solved his vibrational problem by incorporation of teeth-shaped holding members bearing down upon the electrode plate groups and positioned intermediate the strap connections of a battery. While undoubtedly helpful in reducing the effects of vibration, the hold down member by virtue of its location will not positively locate the strap members or prevent relative movement between the straps and the housing of the battery.

Another approach to the vibration problem has been to use recessed portions of the battery casing which bear down on separator edges which extend beyond the edges of the plates, disclosed for instance in U.S. Pat. No. 4,346,151 to Uba et al. Other prior art of which Applicant is aware are U.S. Pat. Nos. 2,480,964 to Randall, 2,521,924 to Longaker and 2,702,829 to Chapel.

It is a primary object of this invention to provide a battery which is substantially vibration proof irrespective of the direction of vibrational forces. It is another object to provide a device for a battery serving the dual functions of vibration resistance and electrical insulation.

SUMMARY OF THE INVENTION

Briefly described, the battery of the invention comprehends the usual cell housing in which is disposed at least one positive electrode plate, at least one negative electrode plate, a plurality of projecting positive plate tabs and a connecting strap uniting the same, a plurality of projecting negative plate tabs and a connecting strap uniting the same, a separator interposed between the positive and negative plates, and an electrolyte. The improvement is directed to an electrode plate group vibration support means which at least partially envelops at least one of the connecting straps. The support comprises a comb-like portion which underlies the strap in close proximity thereto and which has teeth interposed between the projecting tabs associated with such strap. The vibration support also has a hood portion which overlies the strap in close proximity thereto. The cell is provided with means for limiting, preferably precluding, relative movement between the vibration support and the cell housing, such as a fixed attachment therebetween.

BRIEF DESCRIPTION OF THE DRAWINGS

Certain preferred forms of the invention will be described with reference to the accompanying drawings, wherein like numerals designate like parts, and in which.

PREFERRED EMBODIMENTS OF THE INVENTION

Figure 1:
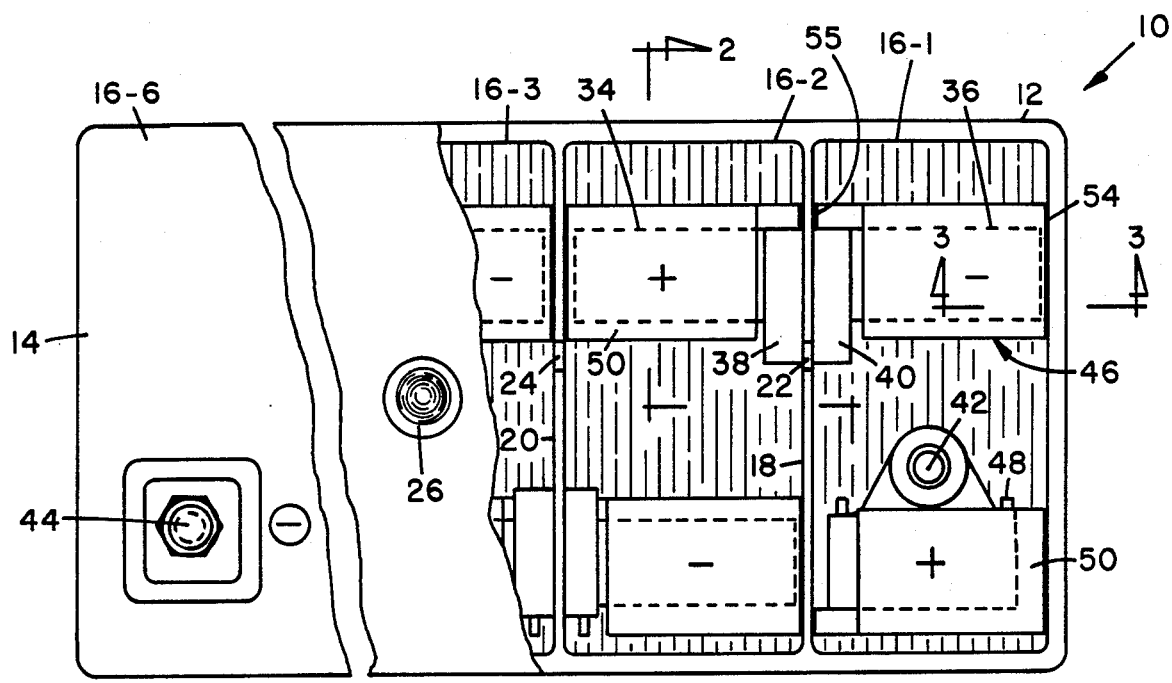
FIG. 1 is a plan view, partially cutaway of a multicell battery in accordance with the invention.

The invention is broadly applicable to various batteries systems, including particularly flooded or limited electrolyte alkaline and acid systems of single or multiple cell configurations. For illustrative purposes only, a preferred embodiment of the invention (FIGS. 1-5) will be described as applied to a sealed recombining type lead-acid battery which is designed particularly as one-half of an aircraft starter battery.

Referring to the drawings, the battery of the invention is shown generally at 10 and includes a nonconductive housing composed of a jar or container 12 sealingly joined to a lid 14. The housing contains six cells 16-1, 16-2, 16-3 . . . -6 separated by nonconductive partitions 18, 20, . . . which are preferably integrally molded with and form a part of the housing. Each of the partitions in turn may be provided with notches 22, 24 which define a passageway common to and interconnecting all of the cells and which communicates with resealable bunsen valve 26, set to relieve internal pressure above a desired superatmospheric pressure (for additional details in respect of the sealed gas recombining lead-acid battery, see U.S. Pat. No. 3,862,861 and Ser. No. 221,226 filed Dec. 29, 1980, now U.S. Pat. No. 4,383,011).

Each cell contains at least one positive plate 27 and at least one negative plate 25 spaced by interposed separator elements 29. Normally there will be provided a plurality of each polarity plate within a given cell stacked in interleaved parallel fashion, however continuous plates may also be employed rolled together in a spiral, flat wound, interleaved in accordion style, or the like. Each positive plate may be formed with active material applied to a lead or composite grid 28, and similarly the negative plate active material is applied to a grid 30. The grids are provided with respective projecting positive plate tabs 31 and negative plate tabs 32 (see FIG. 3). Each cell has at least two tabs of each polarity, united to a common polarity positive strap 34, and negative strap 36, respectively. Typically the straps are joined to the tabs by the cast-on process, although other techniques may be employed.

The positive and negative straps, which typically may have the same cross section and length, preferably are formed with integral upstanding lugs e.g., 38, 40 which are joined together in sealing relationship through an aperture formed in partition 18 by any desired method, such as by the extrusion fusion process. In this manner, the cells are series connected to form a 12-volt battery. The end cells are provided with the usual positive and negative output terminals 42, 44, which make a through-the-lid sealed connection with the corresponding positive and negative straps.

In the usual manner sulfuric acid electrolyte of desired specific gravity is absorbed within the plates and separator material, in the pore structure thereof, preferably in a starved amount (less than saturated) such that evolved gasses will be able to readily diffuse through voids in the porous elements to be internally recombined at thin film sites.

In accordance with the invention, the plate connecting straps and hence the corresponding plate groups are virtually immobilized by provision of vibration support member 46 which at least partially envelops the connecting strap, and which is preferably anchored to the cell housing to limit relative movement between the vibration support and the housing. In the preferred embodiment where the vibration support is fixedly attached to the walls and partitions of the cell housing relative movement between the vibration support and the housing will be substantially fully precluded.

Figure 3:
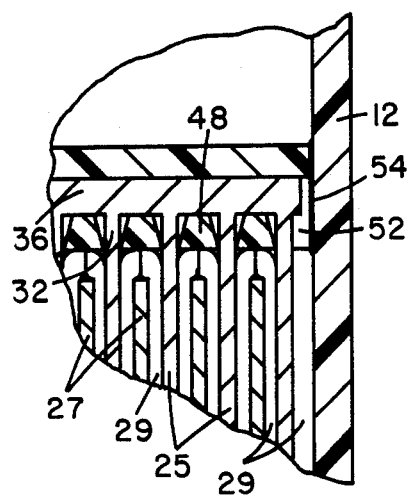
FIG. 3 is a fragmentary elevational view taken along section 3—3 of FIG. 1.

The vibration support 46 comprises a comb-like portion which underlies straps 34, 36 and has a series of tines or teeth 48 which are interposed between the projecting tabs 31, 32 associated with its respective opposite polarity connecting strap. The tops of teeth 48 are positioned in close proximity to the undersurface of the strap and, as shown in FIG. 3, in the preferred embodiment make substantial contact therewith. Although some side clearance may be provided, the teeth are also preferably in close proximity and mesh fairly closely with the corresponding upstanding tabs 31 or 32.

As seen best in FIG. 3, each of tines 48 overlies the intermediate plate grouping, in this case positive plates 27, thereby also serving as an insulator to prevent shorting with the negative connecting strap 36 in the event of growth or expansion of plates 27 in use. It is also preferred that separator 29 extend beyond the plate groupings and thereby serve as an insulative cushion between tines 48 and the underlying plate groupings, to also serve as an insulator as well as a cushion to absorb vibrational forces.

The vibration support is also provided with a hood portion 50 which overlies the connecting strap 34, 36 in close proximity thereto, and preferably in substantial contact therewith. The hood is slotted to provide clearance with lugs 38, 40, thereby defining overhang 51. Although in appropriate situations the comb-like underlying portion and the hood portion may be separate pieces, it is preferred that they be linked together as an integral whole via interconnecting side portion 52. With this embodiment the vibration support 46 is in C-clip form and envelops the top, bottom and one side of the connecting strap and immobilizes the connecting strap by being preferably fixedly attached to the battery housing. Alternatively the support may include an additional side portion so as to fully surround the strap.

Figure 5:
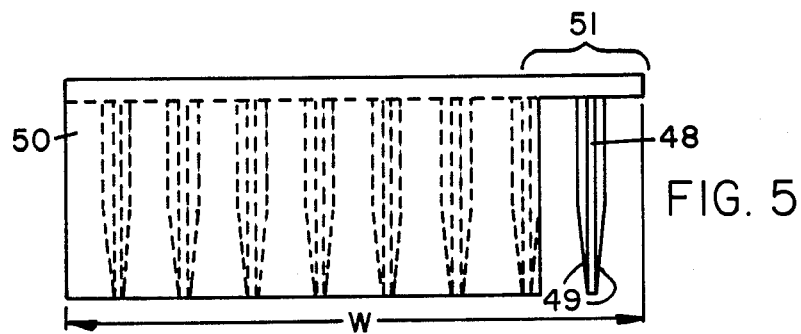
FIG. 5 is a top plan view of the vibration support member of FIG. 4.

The attachment can be provided in various ways including adhesive bonding, mechanical attachment or interlock, or the like. In a preferred embodiment the width "w" as shown in FIG. 5 of the vibration support is substantially the same as the width of the cell opening as shown in FIG. 1, and marginal interfaces 54, 55 (represented by heavy lines) are solvent bonded respectively to the end wall 12 of cell 16-1 and intercell partition 18. As an example, the battery housing, intercell partition and the vibration support clip 46 may be molded of ABS, and solvent bonded together with the use of methylethyl ketone or other suitable solvent, to form an immobile attachment.

While it is preferred to attach support 46 at both ends, the end opposite the intercell lug connection at 38/40 is most crucial, since the strap otherwise acts as a beam, unsupported at such opposite end. Thus bonding or attachment solely at end 54 will suffice in most instances. Alternatively the support can be attached to the underside of lid 14.

Figure 2:
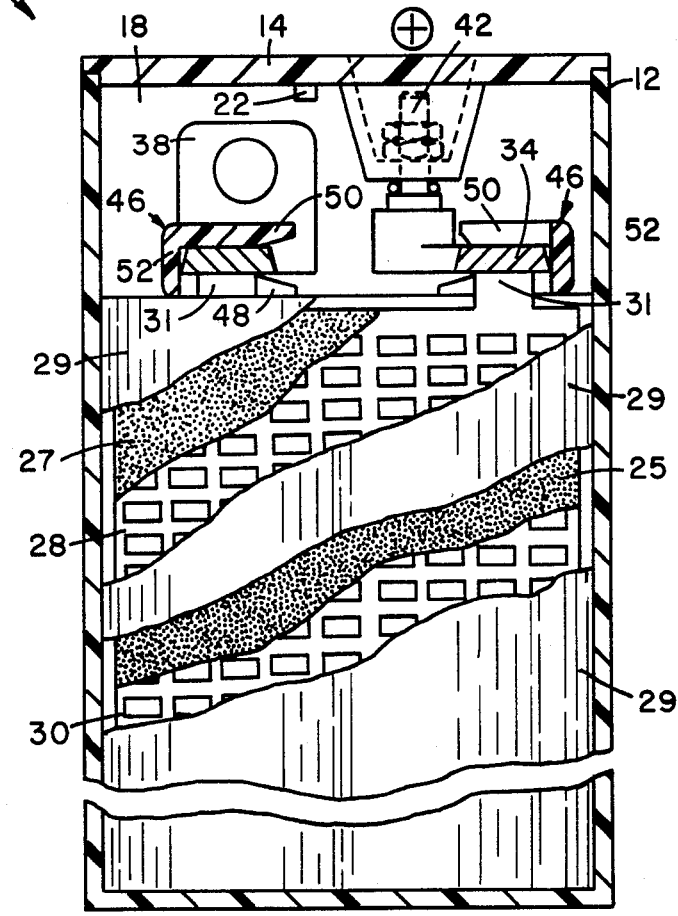
FIG. 2 is a partial cutaway elevational view taken along section 2—2 of FIG. 1.

The vibration support clip 46 is preferably installed after the cell pack of plates and separators has been inserted in the appropriate cell housing, by applying solvent to the end surfaces 54, 55 of the clip, and then installing the clip by inserting the teeth or tines 48, which are provided with taper 49 to facilitate installation, between the appropriate upstanding tabs until the connector portion 52 bottoms out against the side of the connecting strap, as shown in FIG. 2. To compensate for the possible cold flow of the plastic clip, the undersurface 53 of hood portion 50 (see FIG. 4) may be tapered to converge slightly toward the upper surface of tines 48 and be appropriately spaced apart to produce a press fit as the clip is installed over the strap.

Figure 4:
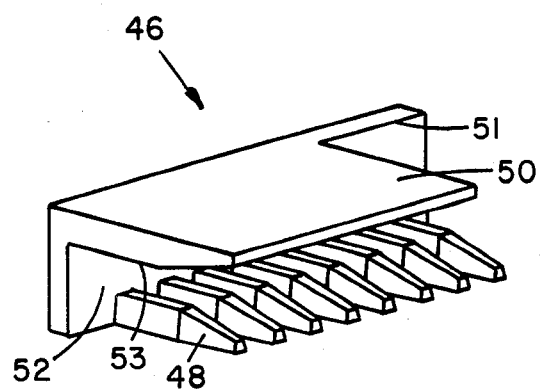
FIG. 4 is a perspective view of a vibration support member in accordance with the invention.
Figure 6:
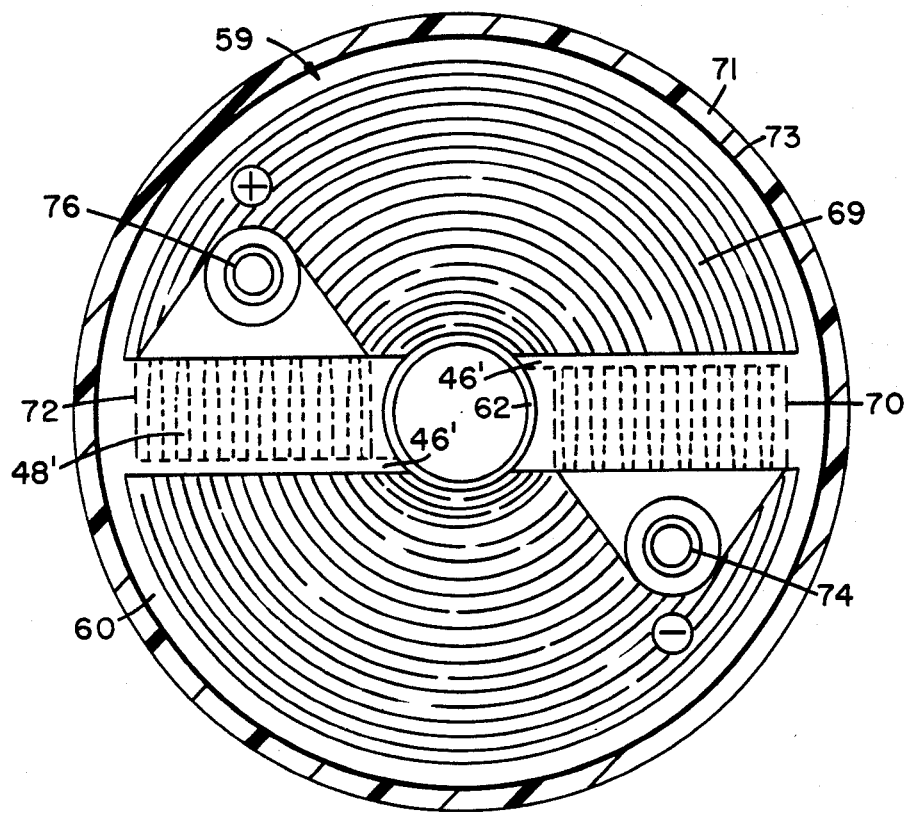
FIG. 6 is a plan view of the inner top portion of a single cylindrical cell, employing an alternative embodiment of the invention.

An alternative embodiment is shown in FIG. 6, a combined insulator and vibration support 59 adapted for cylindrical cells. In this embodiment clips 46' radiate from an internal hub 62, and are joined together at their perimeter by a circular rim 60. Each of clips 46' may be similar to clips 46 as shown in FIG. 4 of the previous embodiments, having tines 48' which mesh with plate tabs of a given polarity united to negative strap 70 and positive strap 72, respectively. Straps 70 and 72 are respectively connected, preferably integrally, to negative 74 and positive 76 output terminals. The specific embodiment of FIG. 6 is adapted to a relatively large cylindrical cell having thin (continuous) plates with aligned upstanding tabs. The combination insulator and vibration support 59 may be formed of a single plastic molding. It may be installed similarly to the embodiment of FIG. 1, by applying solvent around the perimeter rim 60, and then by placing vibration support 59 onto the top of the cylindrical (e.g., spiral wound) battery element 69 and inside housing 71 with the straps positioned between (adjacent) radial clip members 46'. The entire clip 59 is then positioned so that teeth 48' line up with the appropriate tabs, and then member 59 is rotated in clockwise fashion to mesh the teeth with the tabs and engage each of the corresponding strap members. An annular bond is formed at interface 73. Further immobilization may be effected by bonding the hub member 62 to the underside of the battery lid (not shown).

While certain representative embodiments and details have been shown for the purpose of illustrating the invention, it will be apparent to those skilled in this art that various changes and modifications may be made therein without departing from the spirit or scope of the invention.

What is claimed is:

1. In a battery composed of at least one electrochemical cell comprising a cell housing in which is disposed at least one positive electrode plate, at least one negative electrode plate, a plurality of projecting positive plate tabs and a connecting strap uniting the same, a plurality of projecting negative plate tabs and a connecting strap uniting the same, separator interposed between the positive and negative plates, and an electrolyte, the improvement comprising an electrode plate group vibration support means at least partially enveloping a connector strap and comprising a comb-like portion underlying the strap in close proximity thereto and having teeth interposed between the projecting tabs associated with such strap, and a hood portion overlying the strap in close proximity thereto, and said cell being provided with means for limiting relative movement between the vibration support means and the cell housing.

2. The battery of claim 1 in which the vibration support means also serves as an insulator to prevent opposite polarity plate edges from making contact with the connecting strap.

3. The battery of claim 1 wherein the comb-like portion and the hood portion of the vibration support means are attached together through an interconnecting portion to form an integral vibration support means.

4. The battery of claim 3 wherein the comb-like portion, hood portion and interconnecting portion are formed in the shape of a C-clip.

5. The battery of claim 1 wherein at least one end of the vibration support means is fixedly attached to the cell housing.

6. The battery of claim 5 wherein the vibration support means has a length which is substantially the same as the width of the housing, and the vibration support means is bonded to the wall of the housing.

7. In an electrochemical cell comprising a housing in which is disposed at least one positive electrode plate, at least one negative electrode plate, a plurality of projecting positive plate tabs and a connecting strap uniting the same, a plurality of projecting negative plate tabs and a connecting strap uniting the same, separator interposed between the positive and negative plates, and an electrolyte contained within the housing, the improvement comprising an electrode plate combination insulator and vibration support means at least partially enveloping a connecting strap and comprising a comb-like portion underlying the strap in close proximity thereto and having teeth interposed between the projecting tabs associated with such strap, a hood portion overlying the strap in close proximity thereto, and an interconnecting portion attaching the comb-like portion to the hood portion, and said cell being provided with means for substantially precluding relative movement between the combination insulator and vibration support means and the cell housing.

8. The cell of claim 7 wherein at least one of said hood portion and interconnecting portion is fixedly bonded to the cell housing.

9. The cell of claim 7 wherein said comb-like portion, hood portion and interconnecting portion are in the form of a C-clip.

10. The cell of claim 9 wherein one of said hood or interconnecting portion is fixedly bonded to the cell housing wall.

11. In a battery composed of a plurality of electrochemical cells comprising a battery housing divided into individual cells by intercell partitions, the cells including at least one positive electrode plate, at least one negative electrode plate, a plurality of projecting positive plate tabs and a connecting strap uniting the same, a plurality of projecting negative plate tabs and a connecting strap uniting the same, separator interposed between the positive and negative plates, an electrolyte contained within the housing, and through-the-partition intercell electrical connections, the improvement comprising an electrode plate group vibration support means at least partially enveloping a connecting strap within a cell and comprising a comb-like portion underlying this strap in close proximity thereto and having teeth interposed between the projecting tabs associated with such strap, a hood portion overlying the strap in close proximity thereto, and an interconnecting portion attaching the comb-like portion to the hood portion, and said cell being provided with means for limiting relative movement between the vibration support means and the cell housing of the battery.

12. The battery of claim 11 wherein the hood portion of the vibration support means is of lesser longitudinal extent than the comb-like portion, to provide a clearance for said intercell electrical connection.

13. The battery of claim 11 wherein at least one of said hood portion or interconnecting portions is fixedly attached to the wall and/or intercell partition of the battery housing.

14. The battery of claim 13 wherein each end of the vibration support means is fixedly bonded to the wall and/or intercell partitions of the battery housing.

15. In a lead-acid battery composed of at least one electrochemical cell comprising a cell housing in which is disposed at least one porous positive electrode plate, at least one porous negative electrode plate, a plurality of projecting positive plate tabs and a connecting strap uniting the same, a plurality of projecting negative plate tabs and a connecting strap uniting the same, a compressible porous separator interposed between the positive and negative plates, and an electrolyte absorbed within pores of the plates and separators, the improvement comprising an electrode group combination insulator and vibration support means formed of nonconductive material and at least partially enveloping each of the positive and negative connecting straps, and comprising a comb-like portion underlying each strap in close proximity thereto and having teeth interposed between the projecting tabs associated with such strap, a hood portion overlying the strap in close proximity thereto, and an interconnecting portion attaching the comb-like portion to the hood portion, and said cell being provided with means for substantially precluding relative movement between the vibration support means and the cell housing.

16. The battery of claim 15 wherein the combination insulator and vibration support means is in the form of a C-clip fixedly attached at at least one end thereof to the cell housing.

* * * * *